Patented May 20, 1952

2,597,011

UNITED STATES PATENT OFFICE 2,597,011

PREPARATION OF STARCH SPONGE

Majel M. MacMasters and Virginia E. Hoaglund, Peoria, Ill., assignors to the United States of America as represented by the Secretary of Agriculture No Drawing. Application July 28, 1950, Serial No. 176,552

1 Claim. (Cl. 127—32)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the preparation of starch sponge and, more particularly, to the preparation of starch sponge material suitable for surgical uses which involves freezing an aqueous starch gel at a controlled rate, said gel containing a critical concentration of starch with respect to the aqueous medium.

A water-starch mixture, when gelatinized, frozen, and subsequently thawed is known to result in a product of unitary, spongy structure. In U. S. Patents No. 2,423,475 and No. 2,442,928, methods are described for preparing starch sponge in this manner, suitable as a food material or as an internal surgical dressing. Starch sponge, either in block, piece, or powdered form, is known to possess properties which render it valuable as a hemostatic material capable of being absorbed by the body fluids. The sponge material made of starch in accordance with the patents previously mentioned possesses numerous advantages compared with similar spongle-like or fibrous materials. Several advantages are its relative low-cost and adaptability to simple and on-the-spot manufacturing equipment, rendering the material available in practically unlimited quantities in localities of great need and emergency. Furthermore, starch sponge is stable in storage, and can be kept for indefinite periods of time in a state adapted for quick use. Starch sponge has the added advantage over similar surgical material of absorbing aqueous liquids readily, its absorptive action resembling that of blotting paper.

The foregoing advantages of starch sponge as a surgical material are achieved only in the case of sponge possessing a fine and uniform texture, whereas sponge made by methods heretofore described often possesses a coarse, non-uniform texture. We have also discovered that the sponge must possess a critical degree of fragility when wet. It must be capable of being torn into pieces for ease in removal from a deep incision, if desired, or for proper packing of an incision. This fragility must not be too great, for the sponge, when wet, must possess sufficient cohesive strength and pliability to permit manipulation without disintegration. We have found, moreover, that starch sponge possessing the aforementioned fine and uniform texture and critical fragility also possesses a high degree of absorbability, i. e., ability to be absorbed by the body fluids.

We have, moreover, found that the concentration of starch with respect to aqueous medium prior to freezing and the rate of freezing have a critical effect upon the texture, uniformity, and fragility of the resulting starch sponge. As noted in the patent applications previously referred to, starch sponge material may be prepared from a wide variety of starches, for example, cereal starches such as corn starch, wheat starch, and the root starches such as potato starch, and the like. The characteristic of the resulting sponge varies slightly with each individual starch, and it will be understood by those skilled in the art that the critical limitations discussed hereinafter may vary to a minor degree for different starches. With respect to the cereal starches, such as corn, wheat, or rice starch, the concentration of starch in the aqueous medium prior to freezing should be at least sufficient to form a self-supporting gel. This lower critical amount may be as low as 5 percent in some cases, the gelling ability of low concentrations varying not only with the kind of starch used but also with the physical and/or chemical history and genetic propensities of any given kind of starch. The upper limit of concentration likewise varies somewhat but usually does not exceed 10 percent, although satisfactory surgical starch sponges have been prepared from starch using concentrations up to 12 percent. With respect to tuber or root starches, such as potato starch, the preferred range of concentration for a satisfactory surgical sponge is from 8 to 12 percent.

The rate of freezing of the starch paste must be so controlled that discrete ice crystals are formed. This requires a freezing rate of substantial slowness in order to prevent "quick freezing" which would produce a homogeneously solidified paste which thaws into a non-spongy product. At the same time, the rate of freezing must be sufficiently rapid that the ice crystals are not permitted to grow to any substantial size. We have found that freezing starch pastes at temperatures below −8° C. produces minute, yet discrete, ice crystals. The particular temperature employed, however, may vary considerably so long as "quick" or instantaneous freezing is avoided.

We have found that a relatively highly refined starch or starch fraction should be used for surgical sponge purposes. The sponges may be damaged in the process of manufacture in removing moisture from the thawed sponge. We remove excess moisture by gentle pressure as a preliminary step. Unless the foregoing limitations of concentration have been observed, the sponge may be damaged in this step due to structural weakness, and a horny product of low absorptiveness will be obtained after final drying.

The final drying of the moist pressed sponge may be accomplished by drying in a desiccating atmosphere, care being taken to avoid excess temperatures during the drying. Alternatively, the moist pressed sponge may be dried by soaking in a desiccating liquid, such as alcohol, and then gently pressing, followed by air drying. The soaking and pressing may be repeated in a number of cycles of the same or different liquids, if desired. Final traces of the desiccating liquid may be removed from the dry sponge by heating.

The following specific examples illustrate the invention. A series of cereal and root starches were pasted in varying concentrations and frozen at approximately −18° C. The time of freezing was approximately 24 hours, although containers of larger capacity may require up to 48 hours or longer for complete freezing.

The procedure was as follows:

The required proportions of starch and distilled water were measured into a stainless steel bain-marie. For instance, about 3.7 liters of distilled water were used, about 200 to 400 ml. of which were blended with the previously weighed starch to form a smooth slurry, and the slurry strained through No. 17 bolting silk or nylon. The remainder of the water was then added to the slurry. This mixture in the bain-marie was then placed in the steam pot and heated with stirring for about 20 minutes to gelatinize the starch and form a paste.

The starch paste was then poured into shallow porcelain pans to a depth of ½″ to 1″, the paste allowed to cool to room temperature, and then frozen. When frozen, the sponge was allowed to thaw partially for approximately one-half hour, whereupon a thin skin which forms upon freezing is peeled from the surface. The sponge is then permitted to thaw completely, whereupon it is cut into squares and gently pressed to remove excess water. The moist sponge was then cut into blocks approximately 3″ x 1″ x 1″, soaked in 80 percent ethanol, pressed again to remove liquid, and placed in 100 percent ethanol. The sponge was then pressed and dried in a forced draft at room temperature. The final drying can also be accomplished by subjecting the sponge to a vacuum for 15 minutes. The sponge samples were then examined for texture, uniformity, structural strength, and absorptiveness. The results are tabulated below.

The heating or paste formation step, as specified in U. S. Patent No. 2,442,928, previously referred to, is carried out in the temperature range 70° to 100° C. Temperatures of 85° C. or 90° C. to 100° C. are preferred. The paste may also be formed at temperatures higher than 100 C. employing elevated pressures.

*Table I*

| Starch | Conc'n per cent | Texture | Absorptiveness | Class [1] | Remarks |
|---|---|---|---|---|---|
| Wheat | 5 | Fine | Slow | B | Fairly brittle. |
| Do | 6 | do | do | B | Brittle. |
| Do | 7 | do | do | B | Fairly brittle, somewhat horny. |
| Do | 9 | do | Rapid | A | Brittle. |
| Do | 10 | do | do | A | Do. |
| Do | 11 | Somewhat coarse | Slow | B | Do. |
| Potato A | 5 | do | do | C | Do. |
| Do | 6 | do | do | C | Rather tough. |
| Do | 7 | Rather coarse | do | C | Fairly brittle. |
| Potato B | 5 | do | do | C | Fairly brittle, somewhat horny. |
| Do | 6 | do | Rapid | B | Brittle, partially horny. |
| Do | 7 | do | Slow | C | Partially horny, rather tough. |
| Do | 9 | Fine | Rapid | A | Brittle. |
| Do | 10 | do | do | A | Do. |
| Do | 11 | do | do | A | Do. |
| Do | 13 | do | Slow | C | Fairly brittle. |
| Do | 15 | do | do | B | Pitted, somewhat tough. |
| Tapioca | 5 | Coarse | do | C | Fairly brittle, horny. |
| Do | 12 | Fine | do | C | Horny, rather tough. |
| Do | 15 | do | do | C | Brittle, horny. |
| Corn | 5 | Coarse | Rapid | C | Fragile. |
| Do | 6 | Somewhat coarse | do | B | Do. |
| Do | 7 | Fine | do | A | Brittle. |
| Do | 9 | do | do | A | Do. |
| Do | 10 | do | do | A | Do. |
| Do | 11 | Somewhat coarse | do | B | Do. |
| Do | 12 | do | do | C | Do. |

[1] Sponges classified by appearance, handling properties, fragility, etc., as follows:
A: good surgical sponge.
B: acceptable surgical sponge.
C: unacceptable surgical sponge.

We claim:

In the preparation of starch sponge for surgical use, the improvement comprising heating a mixture of starch and water to form a paste, freezing the starch paste at about minus 18° C. and at a rate such that the freezing process continues for at least 24 hours to promote the formation of minute, discrete ice crystals, and thawing the resulting frozen starch sponge, the thawing being initially partial, whereupon a thin skin, which formed upon freezing, is peeled from the surface, the sponge being then thawed completely, said starch-water mixture being of the proportions tabulated below, depending upon the particular type of starch used:

| Kind of starch | Per cent starch in paste | |
| --- | --- | --- |
| | Lower Limit | Upper Limit |
| Corn | 7 | 10 |
| Potato | 9 | 11 |
| Wheat | 7 | 10 |

MAJEL M. MacMASTERS.
VIRGINIA E. HOAGLUND.

REFERENCES CITED

The following references are of record in the file of this patent:

UNITED STATES PATENTS

| Number | Name | Date |
| --- | --- | --- |
| 1,939,236 | Stokes | Dec. 12, 1933 |
| 2,423,475 | Bice | July 8, 1947 |
| 2,442,928 | MacMasters | June 8, 1948 |
| 2,444,124 | Wedler | June 29, 1948 |